United States Patent [19]

Moriguchi et al.

[11] Patent Number: 4,809,063
[45] Date of Patent: Feb. 28, 1989

[54] MULTICOLOR PRINTING METHOD USING RECTANGULAR DITHER MATRICES OF DIFFERENT SIZE, SHAPE, AND ARRANGEMENT OF THRESHOLD VALUES TO MINIMIZE OVERLAP OF DIFFERENTLY COLORED INKS AT LOWER GRADATIONS

[75] Inventors: Haruhiko Moriguchi; Inui Toshiharu, both of Ebina, Japan

[73] Assignee: Fuji Xerox Co., Ltd., Tokyo, Japan

[21] Appl. No.: 203,567

[22] Filed: May 26, 1988

[30] Foreign Application Priority Data

Nov. 9, 1983 [JP] Japan .................... 58-210617

[51] Int. Cl.[4] .......................... H04N 1/46; H04N 1/40
[52] U.S. Cl. ....................... 358/75; 358/283; 358/298
[58] Field of Search ............. 358/75, 75 IJ, 78, 80, 358/283, 298

[56] References Cited

U.S. PATENT DOCUMENTS

| | | | |
|---|---|---|---|
| 3,381,612 | 5/1968 | Lecha | 358/80 |
| 3,742,129 | 6/1973 | Roberts et al. | 358/78 |
| 4,308,553 | 12/1981 | Roetling | 358/75 |
| 4,367,482 | 1/1983 | Heinzl | 358/75 IJ |
| 4,412,225 | 10/1983 | Yoshida et al. | 358/75 IJ |
| 4,412,226 | 10/1983 | Yoshida | 358/75 IJ |
| 4,413,275 | 11/1983 | Horiuchi et al. | 358/78 |
| 4,415,920 | 11/1983 | Kato et al. | 358/80 |
| 4,486,788 | 12/1984 | Yamada | 358/298 |
| 4,507,685 | 3/1985 | Kawamura | 358/283 |
| 4,546,381 | 10/1985 | Kurata et al. | 358/78 |
| 4,547,814 | 10/1985 | Hirosawa | 358/298 |
| 4,595,948 | 6/1986 | Itoh et al. | 358/75 IJ |
| 4,626,901 | 12/1986 | Tanioka | 358/75 |
| 4,752,822 | 6/1988 | Kawamura | 358/75 |

FOREIGN PATENT DOCUMENTS 59-77769  5/1984  Japan ......................... 358/283

Primary Examiner—James J. Groody
Assistant Examiner—Randall S. Svihla
Attorney, Agent, or Firm—Spensley Horn Jubas & Lubitz

[57] ABSTRACT

The likelihood that differently colored inks will overlap is minimized in a multicolor printing system employing the dither method by using a different dither matrix for each color and arranging the lowest threshold valued cells of the dither matrices so that they do not overlap when repeated across a printing surface. A preferred embodiment uses rectangular dither matrices of different size, shape, and arrangement of threshold values.

3 Claims, 3 Drawing Sheets

| A | E | A | E | A | E | -- | -- | | |
|---|---|---|---|---|---|----|----|---|---|
| F | C | F | C | F | C | -- | -- | | |
| D | B | D | B | D | B | -- | -- | | |
| A | E | A | E | A | E | -- | -- | | |
| | | | | | | | | | |

| B | F | D | B | F | D | B | F | D | -- |
|---|---|---|---|---|---|---|---|---|----|
| E | C | A | F | C | A | E | C | A | -- |
| B | F | D | B | F | D | B | F | D | -- |
| | | | | | | | | | |
| | | | | | | | | | |

| C | F | B | C | F | B | C | F | B | -- |
|---|---|---|---|---|---|---|---|---|----|
| I | E | H | I | E | H | I | E | H | -- |
| A | G | D | A | G | D | A | G | D | -- |
| | | | | | | | | | |
| | | | | | | | | | |

— MG

MULTICOLOR PRINTING METHOD USING RECTANGULAR DITHER MATRICES OF DIFFERENT SIZE, SHAPE, AND ARRANGEMENT OF THRESHOLD VALUES TO MINIMIZE OVERLAP OF DIFFERENTLY COLORED INKS AT LOWER GRADATIONS

This is a continuation of application Ser. No. 668,733 filed on Nov. 6, 1984, now abandoned.

BACKGROUND OF THE INVENTION

1. Field of the Invention

This invention relates to a multicolor printing method wherein a color image is separated into a plurality of colors at every picture element unit, thereby enabling multicolor printing using printing methods such as thermal transfer, ink jet or the like.

2. Description of the Prior Art

Heretofore, a tone gradation reproduction method known as the dither method has been used. In the dither method, the density of a plurality of black picture elements in a minute unit area is changed so as to create the effect of multiple tone gradation in a binary type of black-and-white printing. More specifically, an original image which is to be reproduced by the dither method is divided into a plurality of unit square regions each consisting of n×n picture elements (an n×n dot matrix). Threshold levels for deciding between black or white at each picture element are made to differ from one another over the $n^2$ picture elements in each unit square region. In this case, the threshold levels of the plural picture elements in each unit square region can be viewed as defining an n×n matrix (which is called a dither matrix or dither pattern). Such a dither method has widely been utilized also in multicolor printing wherein the image is separated into three primary colors and differing threshold values are used for deciding between color-on or color off.

Conventional multicolor printing systems using the dither method typically employ the same dither pattern for each color. Accordingly, when ink layers of different colors are superimposed one upon another at the same picture element, the resulting printed image produces color saturation and brightness effects different from those of the original image. Further, there is an additional disadvantage in superimposing colors using the same dither pattern in combination with thermal transfer printing. In that case, fixation becomes difficult and produces inferior reproduced picture quality.

The present invention overcomes the above disadvantages and provides a multicolor printing method by which reproduced picture quality can be improved.

SUMMARY OF THE INVENTION

The present invention is characterized by utilizing different dither patterns for each color to effect color gradation in each picture element in multicolor printing. In this case the different dither patterns for each color includes not only patterns of the same sizes and shapes involving different arrangements of the threshold levels for each color, but also patterns having different sizes and shapes for each color.

As a result, with color printing in accordance with the present invention, differently colored ink layers do not lie one upon another at the same picture element with high frequency so that reproduced picture quality can be improved.

BRIEF DESCRIPTION OF THE DRAWINGS

In the accompanying drawings:

FIG. 2 is a view showing changes in threshold levels in performing color gradation in accordance with the dither pattern of FIG. 1a;

FIGS. 4a, 4b, and 4c are views showing changes in threshold levels in performing color gradation in accordance with the dither patterns of FIGS. 3a, 3b, and 3c, respectively;

DESCRIPTION OF THE PREFERRED EMBODIMENTS

Figure 1:
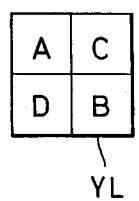
FIGS. 1a, 1b, and 1c views showing an example of the dither patterns used in the present invention.
Figure 1:
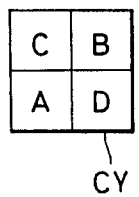
Figure 1:
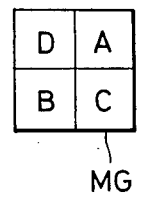

FIGS. 1a, 1b, and 1c are views showing an example of the dither patterns used in accordance with the present invention wherein respective 2×2 dither matrices of yellow YL, cyan CY and magenta MG are shown to have different arrangements of threshold levels A, B, C, and D. The threshold levels A to D may have a variety of relationships, such as for example, A<B<C<D.

The color gradation of the original image using the dither patterns of FIGS. 1a to 1c is performed as follows.

Figure 2:
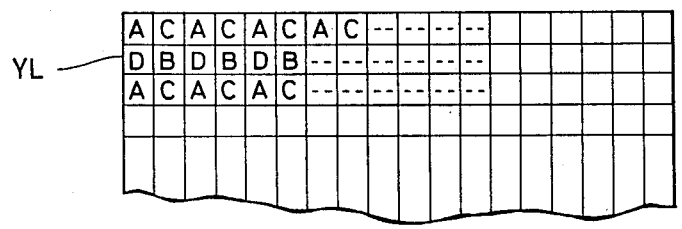

For yellow color gradation, the threshold levels A and C are used in the first or odd numbered one of a plurality of scanning lines and the threshold levels D and B are used in the second or even numbered ones of the plural scanning lines shown in FIG. 2. In contrast, for cyan color gradation, the threshold levels C and B are used in the odd numbered scanning lines and the threshold levels A and D are used in the even numbered scanning lines.

Since each color has a different threshold level arrangement for its corresponding dither matrix, overprinting of colors at the same point of the printing paper is unlikely to occur even is the color densities of each of the different colors falls within the same range, say, between the threshold levels A and B.

Figure 3:
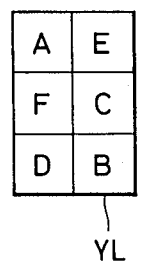
FIGS. 3a, 3b, and 3c are views showing another example of the dither patterns used in the present invention.
Figure 3:
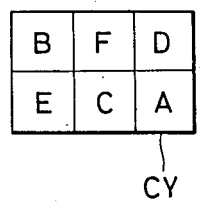
Figure 3:
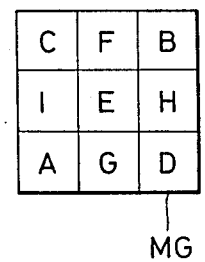

FIGS. 3a through 3c show another example of dither patterns according to the present invention in which the size and form of the dither matrices are varied for each color. In this example, the dither pattern of yellow is composed of two picture elements in the row direction and three picture elements in the column direction, thus forming a 2×3 dither matrix, the dither pattern of cyan forms a 3×2 dither matrix with the row having three picture elements and the column having two picture elements, and the dither pattern of magenta forms a 3×3 dither matrix with the row and the column each having three picture elements. The arrangements of threshold levels A to F (FIGS. 3a and 3b) and A to I (FIG. 3c) are different as shown for each dither pattern.

The color gradation of the original image using the dither patterns of FIG. 3a to 3c is performed by the scanning of the original image in the manner as shown in FIGS. 4a to 4c, which correspond to the scanning with respect to yellow, cyan and magenta, respectively. As seen from FIGS. 4a to 4c, the picture elements corresponding to the threshold level A (shadowed portion in the drawings) for each of the three colors do not overlap. Further, at the picture elements corresponding to the threshold level B, no overlapping in printing occurs with respect to yellow and magenta. Even though the overlapping of colors may occur, this occurrence usually happens only once in plural scannings and therefore the freqency of overlapping can be greatly reduced. As seen from the foregoing, by assigning different threshold arrangement patterns or different dither matrices to each color, the frequency of color overlapping is minimized, resulting in an improved quality of reproduced image.

Figure 5:
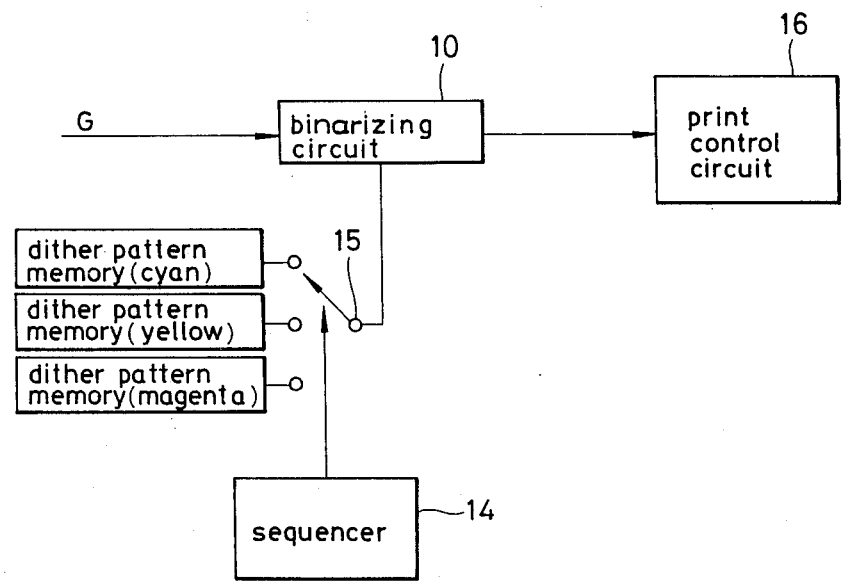
FIG. 5 is a block diagram showing an example of a color gradation circuit to which the present invention is applied.

FIG. 5 shows an example of a color gradation circuit utilized by the present invention. An image signal G is fed into a binarizing circuit 10 where the image signal is binarized by the threshold levels in accordance with the dither patterns of cyan, yellow and magenta. The threshold levels assigned to the elements of the dither patterns for each color pre-stored in dither pattern memories 11, 12 and 13 are selectively read out by a selector 15 for each color and fed into the binarizing circuit 10. The operation of the selector 15 is controlled by a sequencer 14. The binarizing circuit 10 outputs a color gradation signal by binarizing the image signal G in accordance with the threshold levels of the dither pattern for each color. The color gradation signal is fed into a print control circuit 16 which controls the printing of a color image on the printing paper.

Figure 6:
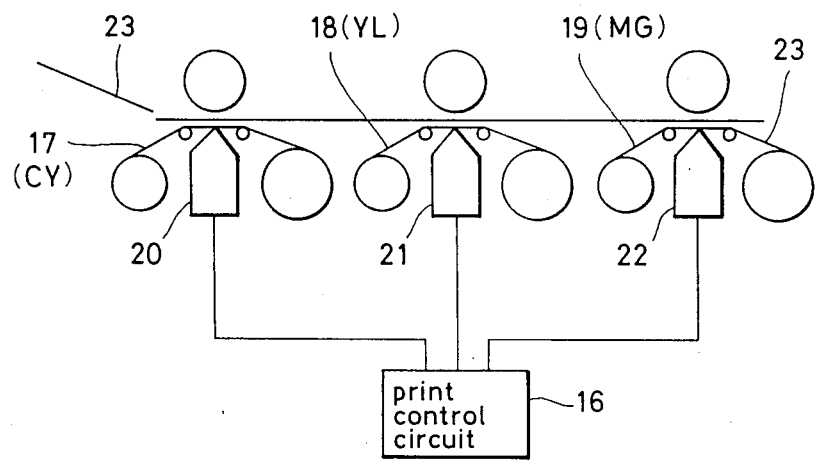
FIG. 6 is a view showing an example of construction of a printing unit of the present invention.

FIG. 6 schematically shows an example of the configuration of a printing unit which comprises a plurality of ink donor films 17, 18 and 19 and thermal heads 20, 21 and 22 provided for printing respectively in cyan, yellow and magenta. The printing of the color image is performed by sequentially printing three colors of cyan, yellow and magenta on the printing paper 23 in accordance with the dither patterns of each color.

What is claimed is:

1. In a multi-gradation, multicolor printing method comprising the steps of generating separate color signals corresponding to a plurality of separable colors in an original image, generating a plurality of binary signals each corresponding to one of the colors by binarizing each color signal using a corresponding one of a plurality of dither patterns each comprising an arrangement of a plurality of threshold values, and performing multi-gradation, multicolor printing by recording each one of the colors using a correspondingly colored one of a plurality of inks in accordance with a corresponding one of said plurality of binary signals, the improvement comprising:

employing rectangular dither patterns which differ in size and in arrangement of said plurality of threshold values for each of said color signals so as to minimize overlapping of said plurality of inks at least at lower gradations.

2. The method according to claim 1, wherein said plurality of dither patterns also differ in shape for each of said plurality of color signals.

3. In a multi-gradation, multicolor printing method comprising the steps of generating separate color signals corresponding to a plurality of separable colors in an original image, generating a plurality of binary signals each corresponding to one of the colors by binarizing each color signal using a corresponding one of a plurality of dither patterns each comprising an arrangement of a plurality of threshold values, and performing multi-gradation, multicolor printing by recording each one of the colors using a correspondingly colored one of a plurality of inks in accordance with a corresponding one of said plurality of binary signals, the improvement comprising:

employing rectangular dither patterns which differ in shape and in arrangement of said plurality of threshold values for each of said color signals so as to minimize overlapping of said plurality of inks at least at lower gradations.

* * * * *